Patented Oct. 9, 1945

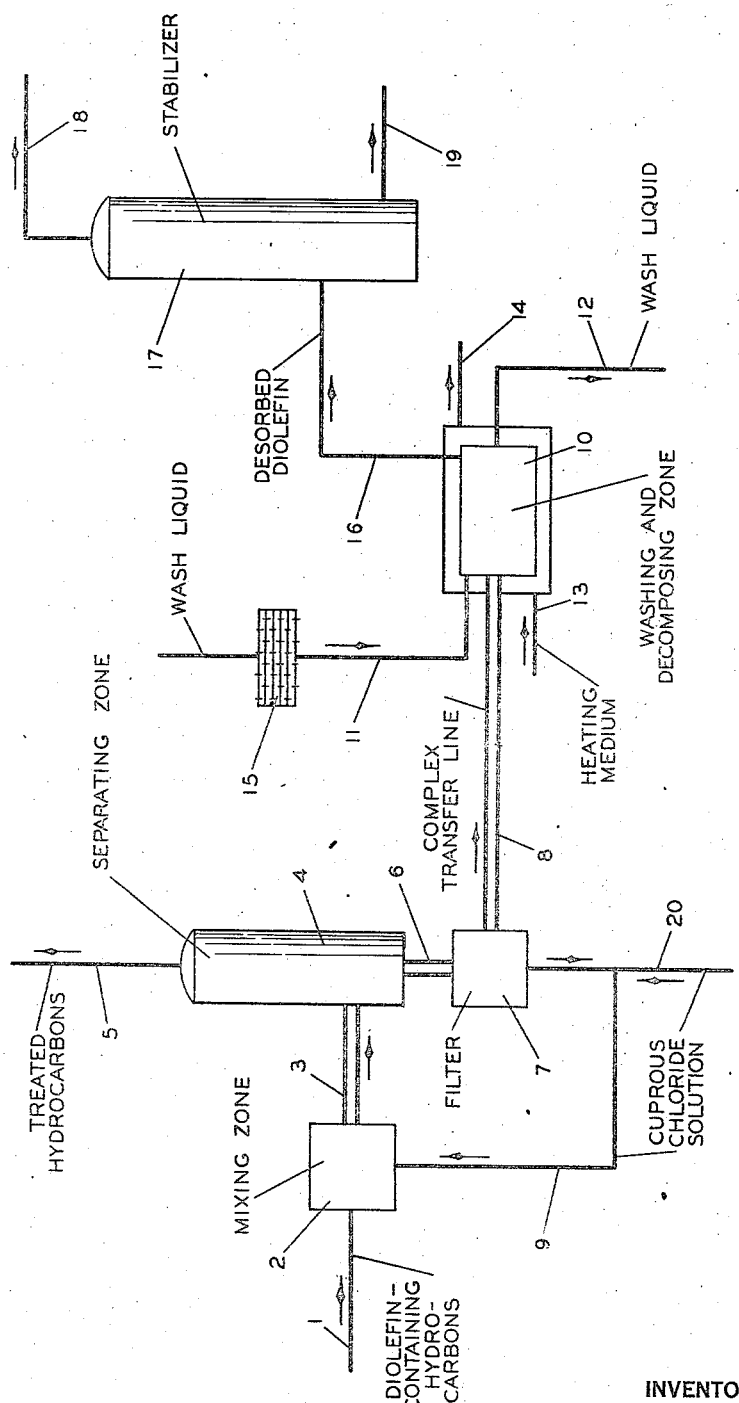

2,386,357

UNITED STATES PATENT OFFICE 2,386,357

PROCESS FOR THE TREATMENT OF HYDROCARBONS

Walter A. Schulze and Lloyd C. Morris, Bartlesville, Okla., assignors to Phillips Petroleum Company, a corporation of Delaware Application January 29, 1942, Serial No. 428,773

3 Claims. (Cl. 260—681.5)

This invention relates to the purification of hydrocarbons, and more particularly to the selective removal and recovery of specific hydrocarbons from hydrocarbon mixtures by the formation and subsequent decomposition of metal salt-hydrocarbon complexes. It has special application to the preparation of substantially pure diolefins.

The diolefins, when formed either as by-products of hydrocarbon processing operations or as a result of various manufacturing processes, always occur in admixture with varying amounts of other difficulty separable hydrocarbons. Moreover, even the most specific manufacturing methods often produce mixtures which contain comparatively minor amounts of the desired diolefins together with paraffinic and/or olefinic hydrocarbons of similar boiling points. Since the utilization of the diolefins is best carried out using substantially pure substances, an important problem is presented in the separation of the accompanying hydrocarbons to produce usable concentrates of the diolefins.

It is known that various materials, especially salts of the monovalent heavy metals of groups I and II of the periodic table, can combine with unsaturated hydrocarbons to form complex salts. A number of processes have been devised, using this fact as a basis of operation, to separate and recover diolefins with varying success, depending on the conditions specified for the utilization of these metal salts and on the process refinements designed to overcome the non-specificity of the reagents. The product from some of these processes is of insufficient purity to permit final processing with satisfactory efficiency, thus requiring further purification or providing a product of inferior quality and consequently lowered value.

Since the reaction of the above-mentioned metal salt reagents is not specific for diolefins such as the butadiene hydrocarbons, the utilization of said reagents in the purification of diolefins ordinarily depends on a preferential rate of reaction and/or the formation of a hydrocarbon-insoluble metal salt-diolefin complex. Thus, a preferred reagent comprises cuprous halides such as the chloride or bromide which produce a solid diolefin addition compound which may be separated under proper conditions from a hydrocarbon mixture and later treated to release and recover the diolefin.

When the cuprous halide reagent is utilized in the form of an aqueous solution, the diolefin complex is formed as a solid precipitate, while the other hydrocarbons may pass unreacted through the contacting zone or may form metal salt complexes and be retained in solution in the aqueous phase. In order to obtain a substantially pure diolefin concentrate it is then necessary to separate the solid diolefin complex from the aqueous phase and the hydrocarbon phase prior to recovering the diolefin.

Similarly, when solid-type metal salt reagents are used with either liquid or gaseous hydrocarbon mixtures, the diolefin addition complex is retained on the reagent surfaces, but the reagent body must be effectively freed of adsorbed and/or condensed non-diolefinic hydrocarbons prior to treatment to liberate and recover the diolefins. In either case the method of treating the diolefin addition complex to substantially completely remove adsorbed, entrained or occluded extraneous hydrocarbons must be conducted under conditions of temperature and pressure and with reagents which do not induce the decomposition of the diolefin-metal salt complex.

In processes for the separation of butadiene from gaseous $C_4$ hydrocarbon mixtures with cuprous halide solutions, it has been suggested that the solid butadiene complex be precipitated from the reaction mixture, and that the solid material and the aqueous solution be heated either together or separately to temperatures which cause evolution of dissolved or chemically combined olefins and other extraneous hydrocarbon gases without causing decomposition of the butadiene complex. Such a procedure, however, is not equally applicable to other diolefins due to the lower decomposition temperatures of the corresponding diolefin-cuprous halide complexes, and to the higher boiling points of the extraneous hydrocarbons. For example, to separate the $C_5$ diolefins, isoprene and piperylenes, in treating $C_5$ hydrocarbon mixtures, temperatures which cause vaporization and evolution of pentanes and pentenes likewise cause liberation of the chemically combined isoprene and piperylenes.

An object of this invention is to improve the purity of hydrocarbons segregated through the formation of decomposable complex addition compounds. Another object is the segregation of diolefins from hydrocarbon mixtures in which they occur. Another object is to provide a method for obtaining the diolefins in substantially pure state as a part of the separation process. Still another object is to disclose a process wherein low-boiling aliphatic diolefins, particularly those which are normally liquid, are substantially completely separated from hydrocarbons having similar volatility through the use of metal salt reagents and particularly of cuprous halide reagents.

According to the process of this invention, a hydrocarbon liquid containing diolefins may be contacted with a solution of a cuprous halide, for example, cuprous chloride, whereby the diolefins form a complex salt with the cuprous chloride. The complex, being substantially insoluble in either phase of the mixture, settles out or may be separated in any other suitable fashion. The precipitated complex is then washed with a paraffinic hydrocarbon liquid of substantially different boiling point from the diolefin, and incapable of dissolving or reacting with the complex or any components of the mixture. By this means, both entrained cuprous chloride solution and adsorbed or occluded extraneous hydrocarbons remaining from the original hydrocarbon mixture are substantially completely removed. The washed complex is then decomposed by heating, the diolefin is recovered, and may be distilled if necessary to remove any amounts of the washing agent which may have been evolved therewith.

A specific arrangement of the steps of this process is indicated diagrammatically in the accompanying drawing. The diolefin-containing stream enters the system by line 1, passing to the mixing zone 2, wherein it is contacted with an aqueous cuprous chloride solution entering by line 9. The intimate mixture of hydrocarbon and aqueous solution passes by line 3 to separating zone 4, wherein the liquid phases are separated, and the hydrocarbon liquid is allowed to overflow at the top. The aqueous phase, carrying the precipitate of diolefin-metal salt complex, passes by line 6 to separation and/or filtration zone 7, whence the aqueous phase, containing the metal salt in solution, returns by line 9 to contact additional amounts of diolefin-containing feed. Periodically, the flow into unit 7 is discontinued, and the solid complex is transferred to zone 10 along line 8, which may represent a screw conveyer, or a similar transporting system for moving the substantially solid material. In zone 10, the complex is washed thoroughly with the wash liquid, entering by line 11 after cooling in cooler 15, and leaving the zone 10 by line 12. When the precipitate has been contacted sufficiently, the flow of wash liquid is stopped. A heating medium is passed by line 13 into unit 10, which is equipped to provide indirect heating to the precipitated complex. The heating medium leaves unit 10 by line 14. The complex is decomposed by the elevated temperature and the diolefin passes out by line 16 to fractionator 17 in which the diolefin may be separated from any remaining wash liquid. If the wash liquid is more volatile than the diolefin, it will pass overhead by line 18, with the diolefin being recovered by line 19. However, if the wash liquid is less volatile than the diolefin, the latter will pass overhead by line 18, and the wash liquid by line 19. After all the diolefin has been recovered from the complex, the cuprous chloride may be removed from or dissolved out from zone 10 to prepare fresh solution. Cuprous chloride may also be recovered from the treated hydrocarbons in line 5 if desired by vaporization or chemical treatment. Fresh cuprous chloride in the form of solid or in the form of a concentrated solution is regularly introduced into line 9 by line 20 to make up for losses of cuprous chloride to the hydrocarbons.

In the foregoing description, it is implied that the process operates batchwise, but this is employed merely for simplifying the explanation since two or more units corresponding to units 7 and 10 may be provided so that operation may be continuous. Therefore, it will be understood that zone 7 and zone 10 may represent a number of such zones, depending on the size and other requirements of the individual installation. Furthermore, the complex may be continuously separated, washed, and decomposed in a continuous flow system by methods well known to those skilled in the art of material handling.

While the process of this invention is broadly applicable to the separation of hydrocarbons which form insoluble complexes with inorganic salts such as cuprous chloride, it is especially applicable to diolefins containing five or more carbon atoms, such as isoprene, piperylene and the like. We have found that the cuprous chloride complexes of these and related diolefins decompose measurably at the temperatures required to vaporize the non-diolefinic hydrocarbons of similar boiling point, even when sub-atmospheric pressures are employed.

By the present invention, such losses are avoided, since a wash liquid is used to remove the extraneous unreacted hydrocarbon liquids from the precipitated diolefin cuprous chloride complex without employing conditions causing decomposition of the complex.

The liquid washing agent which is a particular feature of this invention is a material chosen in accordance with the requirements for its specific function. Suitable liquids include paraffinic hydrocarbons in relatively pure form, or in narrow boiling range mixtures with boiling points substantially different from the boiling points of the diolefins being purified. Aliphatic hydrocarbons of selected boiling ranges are preferred for many applications, although other liquids may be used such as cycloparaffins, aromatics and the like whose properties conform to the following specifications.

These washing agents are preferably solvents for hydrocarbons, possess substantially no solvent capacity for the complex, and are unreactive toward uncombined reagent which may be present along with said complex prior to decomposition or present alone during and/or subsequent to the decomposition of said complexes. Further, the washing agents are chosen on the basis of their boiling points which are materially higher or lower than the boiling points of the diolefins being purified in order that the final separation of washing agents and diolefins, if necessary, may be easily accomplished by differences in volatility. As examples of the selection of washing agents, normal butane is satisfactory for the purification of the cuprous chloride complex of $C_5$ diolefins, and $C_7$ or $C_8$ paraffins or mixtures thereof are suitable examples of higher boiling liquids for the same purpose. Precautions are observed to select washing liquids which do not form objectionable constant-boiling azeotropes with the diolefins since such might cause complications in the ultimate recovery of the diolefins, after decomposition of the metal salt complex.

In the choice of washing liquids which are either higher-boiling or lower-boiling than the diolefins to be purified, it has been found that operating advantages will be obtained by either selection but that the sequence of operations may be somewhat different according to whether the washing liquid is higher or lower-boiling than the diolefin. Depending largely upon availability and the relative volatility of the diolefin being purified, either type of washing liquid may be used according to the terms of the present invention.

If a lower-boiling wash liquid is used, the liquid remaining after the washing step may frequently be removed from the complex by vaporization at temperatures below the decomposition temperature of the complex. This vaporization may sometimes remove the wash liquid sufficiently completely so that fractionation of the subsequently desorbed diolefin is unnecessary.

The washing treatment of the diolefin-metal salt addition compounds by our process is carried out at temperatures below those causing desorption of diolefins, and usually at or slightly above temperatures employed in forming said addition compounds. Thus, when temperatures of 0 to 50° F. are employed in the reaction between diolefins and the cuprous halide reagents, the washing of the solid complex may be done at corresponding temperatures, or at higher temperature up to about 90° F. To obtain temperatures in this range, pre-cooling of the washing liquid may be necessary.

Pressures in the washing operation are ordinarily low superatmospheric pressures sufficient to maintain flow of the liquid and depending to a certain extent on the temperature and on the boiling point of the washing liquid. Thus, when employing butane or propane at atmospheric temperatures, sufficient pressure is provided to maintain liquid phase. With higher-boiling materials, high pressures in excess of those necessary to carry out the washing step by forcing the washing liquid through the bed or layer of solid diolefin complex are usually unnecessary.

The washing liquid may flow through the solid diolefin complex or be mixed therewith in any desired manner which produces satisfactory removal of contaminating materials. We may utilize the vessel or filter means used to separate the complex from the reagent solution as a container for the complex and merely pass the wash liquid therethrough at suitable flow rates and in either upward or downward flow. The flow rate is adjusted to provide satisfactory washing without using excessive volumes of the liquid. Ordinarily from two to ten volumes of wash liquid per volume of complex produce adequate removal of contaminants, although more extensive washing may be required. Also, such devices as batch washing may be employed wherein one batch of liquid is passed through the solid material and drained or forced out before fresh wash liquid is admitted. These and other modifications of the process will be obvious in the light of the foregoing disclosure.

It will be desirable in many cases to provide means for reconditioning the wash liquid to remove hydrocarbons washed from the diolefin-metal salt complex and to permit recirculation of the liquid. Such reconditioning may be accomplished by conventional means such as redistillation. Aqueous and/or solid material entrained in the wash liquid may be settled out by gravity or removed by other means such as filtration or the like.

In decomposing the diolefin complex it is generally our practice to supply the necessary heat to produce desorption temperatures indirectly to avoid contamination of the desorbed diolefin. Temperatures in the range of 115° to 200° F. are ordinarily preferred although higher or lower temperatures may be employed. In many cases it has been found that decomposition of the complex is very slow at temperatures lower than about 115° F. so that operation below this temperature level is not ordinarily practiced. Heating to temperatures above about 200° F. to promote the decomposition reaction may be unsatisfactory and result in excessive consumption of heat and loss of diolefin through polymerization.

While the diolefin leaving the decomposition zone is fairly pure, there is usually a small amount of the washing agent associated therewith. Where propane or butane have been used for washing, the diolefin may be freed of the washing agent merely by vaporization of the remaining traces of same. With other solvents, the diolefin may be finally purified by distillation to separate the last traces of the washing agent. This operation is conventional and is easily accomplished since the washing agent has a markedly different boiling point from the diolefin. The diolefin may be recovered overhead or at the bottom of the distillation unit depending upon whether a higher- or a lower-boiling washing agent has been employed. Following the distillation the diolefin is available in a very highly purified state and substantially undiminished in amount from that entering the treating process.

The following examples will show applications of this invention. Since, however, many modifications may be made in details of this process wholly within the scope of the invention, no limitation is to be implied by the terms of the exemplary operations.

*Example I*

A charge stock containing 64 volume per cent of isoprene and the balance normal and isopentane, pentene-1 and pentene-2 was treated with a saturated solution of cuprous chloride and ammonium chloride at 35-40° F. The complex formed precipitated out and was removed by filtering. The precipitate was then washed at about 50° F. with three portions of liquid butane, each amounting to twice the volume of the solid precipitate. After the last washing, residual butane was removed by vaporization. The decomposition of the complex was then carried out, and the last traces of the butane vaporized from the condensed diolefin. The product was 99 per cent isoprene, boiling between 93.5° and 94.5° F. at atmospheric pressure.

When this charge stock was treated under identical conditions but without the butane wash the product contained only 82 volume per cent isoprene along with 18 per cent pentenes and pentanes.

*Example II*

A mixture of hydrocarbons containing 55 volume per cent of isoprene and piperylenes and 45 per cent of pentanes and pentenes was treated with a cuprous chloride solution at 35° F., and the precipitated complex was removed in a filter. The precipitate was washed at about 60° F. with two portions of a washing agent, each of which contained about one and one-half times the volume of the precipitate. The washing agent was a paraffinic hydrocarbon liquid comprising heptanes and boiling between 180° and 190° F. When substantially all the wash liquid had drained away, heat was applied and the mixed complexes were decomposed. The desorbed products containing a small amount of the wash liquid were then passed to a distillation unit, wherein the diolefins were removed overhead, while the wash liquid was recovered at the bottom of the unit. The diolefin mixture substantially free of $C_5$ paraffins and olefins was then fractionated to yield substantially pure isoprene in one fraction and substantially pure piperylene in the other. When the washing operation was omitted the desorbed diolefin concentrate contained 15 volume per cent of pentenes and pentanes.

Example III

A $C_4$ hydrocarbon mixture containing 22 per cent butadiene, 74 per cent butenes and the balance normal butane was treated at 45° F. with a cuprous chloride solution, and the butadiene complex was precipitated and filtered from the aqueous reagent. The solid was washed with several volumes of liquid propane at 50° F. prior to desorption. Residual propane was vaporized while the solid was heated to a desorption temperature of 190° F. and butadiene of over 99 per cent purity was recovered.

The operation herein set forth has been applied particularly to use with solutions of metal salts. Solid type reagents, for example, impregnated clays and the like, may also be used under this invention by discontinuing the flow of hydrocarbon feed, washing the reagent bed carrying the complex, decomposing the complex and distilling the effluent. It will, therefore, be understood that the use of this improved purification procedure is not confined to processes employing solution type reagents, but may be applied to any process wherein a solid, insoluble complex salt is formed during the operation.

We claim:

1. In a process of separating aliphatic conjugated diolefins from hydrocarbon liquids containing the same and close-boiling non-diolefinic hydrocarbons by contacting said hydrocarbon liquid in the liquid phase with a reagent comprising a salt of a monovalent heavy metal of groups I and II of the periodic system which reacts with aliphatic conjugated diolefins to form a hydrocarbon-insoluble solid metal salt-diolefin complex and thereby effecting combination of said diolefin with said reagent to form said complex, separating said solid complex from the hydrocarbon liquid, and desorbing said diolefin from the separated solid complex by heating the same to desorption temperature, the improvement which comprises removing substantially all entrained non-diolefinic hydrocarbons from said separated complex prior to said desorption step by washing the same with a liquified normally gaseous paraffinic hydrocarbon which is substantially lower-boiling than the components of said hydrocarbon liquid, and conducting said washing step at a temperature substantially below that at which said complex decomposes and at a pressure sufficient to maintain said normally gaseous paraffin in liquid phase.

2. In a process of separating aliphatic conjugated $C_5$ diolefins from a normally liquid $C_5$ hydrocarbon mixture containing the same and close-boiling non-diolefinic $C_5$ hydrocarbons by contacting said hydrocarbon mixture in the liquid phase with a reagent which is an aqueous solution of cuprous chloride whereby the $C_5$ diolefin content of said mixture selectively combines with said cuprous chloride to form a hydrocarbon-insoluble solid cuprous chloride-diolefin complex which is precipitated, separating said precipitated complex, and desorbing said diolefin from the separated complex by heating the same to desorption temperature, the improvement which comprises removing substantially all entrained non-diolefinic hydrocarbons from said separated complex prior to said desorption step by washing same with a liquefied normally gaseous paraffin hydrocarbon which is substantially lower boiling than the components of said hydrocarbon mixture, conducting said washing step at a temperature substantially below that at which said complex decomposes and at a pressure sufficient to maintain said normally gaseous paraffin in liquid phase, and then volatilizing residual normally gaseous paraffin wash liquid from the complex.

3. The process of claim 2 wherein said paraffin is butane.

WALTER A. SCHULZE.
LLOYD C. MORRIS.